(12) United States Patent
Joukov (10) Patent No.: US 11,675,837 B2
(45) Date of Patent: Jun. 13, 2023

(54) ANALYSIS OF DATA FLOWS IN COMPLEX ENTERPRISE IT ENVIRONMENTS

(71) Applicant: ModelizeIT Inc., Stony Brook, NY (US)

(72) Inventor: Nikolai Joukov, Stony Brook, NY (US)

(73) Assignee: ModelizeIT Inc., Stony Brook, NY (US)

( * ) Notice: Subject to any disclaimer, the term of this patent is extended or adjusted under 35 U.S.C. 154(b) by 0 days.

(21) Appl. No.: 14/217,244

(22) Filed: Mar. 17, 2014

(65) Prior Publication Data

US 2015/0261887 A1 Sep. 17, 2015

(51) Int. Cl.
*G06F 16/901* (2019.01)

(52) U.S. Cl.
CPC ................ *G06F 16/9024* (2019.01)

(58) Field of Classification Search
CPC ......... G06F 17/30958; G06F 17/30598; G06F 17/30247; G06F 17/30; G06F 16/9024
USPC ...... 707/603, 955, 999.01, 999.03, E17.032; 370/420; 715/763, 853; 717/109; 703/15
See application file for complete search history.

(56) References Cited

U.S. PATENT DOCUMENTS

| | | | | |
|---|---|---|---|---|
| 2006/0045027 A1* | 3/2006 | Galou | ..................... | H04L 41/12 370/255 |
| 2006/0129670 A1* | 6/2006 | Mayer | ................. | H04L 41/0893 709/223 |
| 2006/0146879 A1* | 7/2006 | Anthias | ................... | H04L 69/22 370/471 |
| 2006/0182034 A1* | 8/2006 | Klinker | ................... | H04L 43/00 370/238 |
| 2007/0192379 A1* | 8/2007 | Finley | ..................... | G06Q 10/10 |
| 2008/0016115 A1* | 1/2008 | Bahl | ....................... | H04L 41/22 |
| 2008/0019499 A1* | 1/2008 | Benfield | ................. | H04L 41/12 379/221.15 |
| 2008/0082978 A1* | 4/2008 | Or | ......................... | G06F 16/252 718/100 |
| 2008/0262990 A1* | 10/2008 | Kapoor | ................... | G06F 9/505 706/20 |
| 2010/0091676 A1* | 4/2010 | Moran | .................... | H04L 47/10 370/252 |
| 2010/0161627 A1* | 6/2010 | Vossen | .................... | G06F 16/20 707/755 |
| 2010/0305990 A1* | 12/2010 | Tyree | ................. | G06Q 10/0637 705/7.36 |

(Continued)

OTHER PUBLICATIONS

Abram et al, "An Extended Data-Flow Architecture for Data Analysis and Visualization", 1995 IEEE Conference on Visualization, Altlanta GA, Oct. 29-Nov. 3, 1995, pp. 263-270.*

(Continued)

*Primary Examiner* — Tony Mahmoudi
*Assistant Examiner* — Kamal K Dewan
(74) *Attorney, Agent, or Firm* — Hoffmann & Baron, LLP (57) ABSTRACT

The present technology enables identification, visualization, and analysis of data flows via network components in complex enterprise IT environments including but not limited to servers, workstations, switches, routers, wireless access points, traffic shapers, firewalls, storage systems and SAN systems. The technology is based on a combination of information collection, information filtering, mapping, grouping, marking, report generation, and verification.

6 Claims, 5 Drawing Sheets

(56) References Cited

U.S. PATENT DOCUMENTS

| | | | | |
|---|---|---|---|---|
| 2010/0332992 A1* | 12/2010 | Donoho | | G06F 16/958 |
| | | | | 715/736 |
| 2011/0213869 A1* | 9/2011 | Korsunsky | | G06F 21/55 |
| | | | | 709/223 |
| 2011/0302647 A1* | 12/2011 | Bhattacharya | | H04L 63/0263 |
| | | | | 726/11 |
| 2012/0240185 A1* | 9/2012 | Kapoor | | H04L 63/1425 |
| | | | | 726/1 |
| 2013/0110840 A1* | 5/2013 | Nair | | G06F 17/30115 |
| | | | | 707/740 |
| 2013/0159863 A1* | 6/2013 | Smith | | H04L 12/2697 |
| | | | | 715/734 |
| 2014/0068057 A1* | 3/2014 | Burchfield | | H04L 63/02 |
| | | | | 709/224 |
| 2014/0157417 A1* | 6/2014 | Grubel | | H04L 63/1433 |
| | | | | 726/25 |
| 2014/0173741 A1* | 6/2014 | Gluck | | G06F 21/54 |
| | | | | 726/25 |
| 2015/0358359 A1* | 12/2015 | Ghai | | G06F 21/55 |
| | | | | 726/23 |
| 2016/0072831 A1* | 3/2016 | Rieke | | G06F 3/04842 |
| | | | | 726/1 |
| 2016/0323139 A1* | 11/2016 | Cordray | | G06F 15/173 |
| 2016/0323153 A1* | 11/2016 | Cordray | | H04L 41/12 |
| 2018/0276254 A1* | 9/2018 | Whitlock | | G06F 16/11 |
| 2020/0112486 A1* | 4/2020 | Lissack | | H04L 43/16 |

OTHER PUBLICATIONS

Jennia Hizver and Tzi-Cker Chieh, Automated Discovery of Credit Card Data Flow for PCI DSS Compliance, in proceedings of IEEE International Symposium on Reliable Distributed Systems (SRDS'11), Oct. 4-7, 2011, pp. 51-58, Madrid, Spain.

Jennia Hizver and Tzi-Cker Chieh, Tracking payment card data flow using virtual machine state introspection, in proceedings of Annual Computer Security Applications Conference (ACSAC'11), Dec. 6-10, 2011, pp. 277-285, Austin, Texas, USA.

* cited by examiner

ANALYSIS OF DATA FLOWS IN COMPLEX ENTERPRISE IT ENVIRONMENTS

BACKGROUND

1. Technical Field

The present invention relates to a computerized system and method for identification, analysis, and visualization of data flows in complex enterprise IT environments.

2. Description of the Related Art

Enterprise Information Technology (IT) systems are complex. Various hardware and software IT components depend on each other in a variety of ways. Data flows from one computer system to another or same computer system via networking devices such as firewalls, routers, wireless access points, switches, storage devices, and appliances. Documentation and knowledge about such data flow and its path is necessary for a variety of IT optimization, transformation, and audit projects. One of such projects is the protection and security of data environments, which definition, in turn, relates to creation and definition of firewall rules and security environments (also sometimes simply called environments or affinity groups).

A number of security standards require proper documentation of data flows of various kinds, typically in the form of graphical diagrams. Traditionally, such diagrams are created manually using diagram drawing software. The information necessary to create data flow diagrams is provided by the owners of IT assets. Manually generated diagrams depict what IT asset owners believe they know about the data flows. Often, some information in the diagrams may be missing or incorrect. In addition to the errors due to information collection, extra errors may be introduced during the manual drawing of the diagrams even if special diagram drawing software is used. The number of network connections, data flows, and devices in the real enterprise IT environments is typically very large and dynamic and, therefore, the probability of a human error is high.

Some software systems that visualize computer system dependencies depict network connections based on network connections monitoring or based on the analysis of software configurations. This method, while automated, does not result in data flow diagrams but rather in the diagrams depicting network connections between computer systems.

There are some tools that were designed to identify data flows from specific data not easily available in the real enterprise IT environments, some of such systems require specific APIs or other intrusive instrumentation to be installed on network devices in order to be functional. For example, J. Hizver and T. Chieh, Tracking payment card data flow using virtual machine state introspection, ACSAC'11, wholly incorporated by reference as if fully set forth herein, require hypervisor API usage, which is not applicable for physical and many virtual servers. Another difficulty with this solution is obtaining authorization to use in the real enterprise IT environments. Other tools attempt to infer transaction flow paths by analyzing the timing of network requests. This information is also not easily available in most real enterprise IT environments.

SUMMARY OF THE INVENTION

The method described hereby enables identification, visualization, and analysis of data flows via network components in complex enterprise IT environments, including but not limited to: servers, workstations, switches, routers, wireless access points, traffic shapers, firewalls, appliances, storage systems, and Storage Area Networking (SAN) systems. The technology relies on a combination of steps such as information collection, filtering, mapping, grouping, marking, report generation, and verification.

There is further presented a system for identification, visualization, and analysis of data flows, wherein the system includes a processor and a memory coupled to the processor. The memory stores a data flow identification, visualization, and analysis tool, which is executed by the processor.

In accordance with an embodiment of the present invention, there is disclosed a computer-implemented method for identifying, visualizing, and analyzing a networked computer environment, wherein the method includes: collecting information about the networked computer environment, including network topology of network components and network connections via a network topology graph, network component dependencies, configurations, and attributes, software components, software objects, and data objects; filtering one or more of the network connections from the information collected based on the software components, software objects, and data objects of certain types that are accessed via the network connections, thus resulting in filtered network connections; identifying data flows between the software components, software objects, and data objects of the certain types over the filtered network connections; mapping the data flows over the filtered network connections to the network components via the network topology graph in order to find paths between the software components, software objects, and data objects of the certain types, wherein each of the paths includes a set of the data flows mapped to a respective set of the network components; marking the set of the data flows included in each of the paths with one or more attributes of the software components, software objects, and data objects of the certain types associated with each of the paths, thus resulting in marked data flows associated with each of the paths; marking the respective set of the network components included in each of the paths with the one or more attributes of the marked data flows, thus resulting in marked network components associated with each of the paths; defining and organizing data environments, security environments, and security zones to include the marked network components; defining firewalls for the data environments, security environments, and security zones; and displaying the networked computer environment including the data environments, security environments, and security zones, filtered network connections, and the marked data flows and the marked network components associated with each of the paths.

In accordance with another embodiment of the present invention, there is disclosed a computer-implemented system to identify, visualize, and analyze a networked computer environment, wherein the system includes: a processing device; and a memory storing instructions that, when executed by the processing device, cause the processing device to perform operations including: collecting information about the networked computer environment, including network topology of network components and network connections via a network topology graph, network component dependencies, configurations, and attributes, software components, software objects, and data objects; filtering one or more of the network connections from the information collected based on the software components, software objects, and data objects of certain types that are accessed via the network connections, thus resulting in filtered network connections; identifying data flows between the software components, software objects, and data objects of the certain types over the filtered network connections; mapping the data flows over the filtered network connections to the network components via the network topology graph in order to find paths between the software components, software objects, and data objects of the certain types, wherein each of the paths includes a set of the data flows mapped to a respective set of the network components; marking the set of the data flows included in each of the paths with one or more attributes of the software components, software objects, and data objects of the certain types associated with each of the paths, thus resulting in marked data flows associated with each of the paths; marking the respective set of the network components included in each of the paths with the one or more attributes of the marked data flows, thus resulting in marked network components associated with each of the paths; defining and organizing data environments, security environments, and security zones to include the marked network components; defining firewalls for the data environments, security environments, and security zones; and displaying the networked computer environment including the data environments, security environments, and security zones, filtered network connections, and the marked data flows and the marked network components associated with each of the paths.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein. In the figures, corresponding or like numbers or characters indicate corresponding or like structures.

DETAILED DESCRIPTION OF PREFERRED EMBODIMENTS

Data is stored, processed, and transferred between computer systems. Documentation of such data and information flows is necessary for many practical purposes including data security, security zones (security environments) organizations, audits and firewall rules optimization. Moreover, for practical security audit and security environment design purposes it is necessary to differentiate between the types of data flows. For example, data related to credit card information should be better protected than most other types of data. In order to properly secure all software and hardware systems that the data is flowing through it is necessary to discover and document (e.g., typically in the form of diagrams) all such hardware and software systems (including the security environments).

Figure 1:
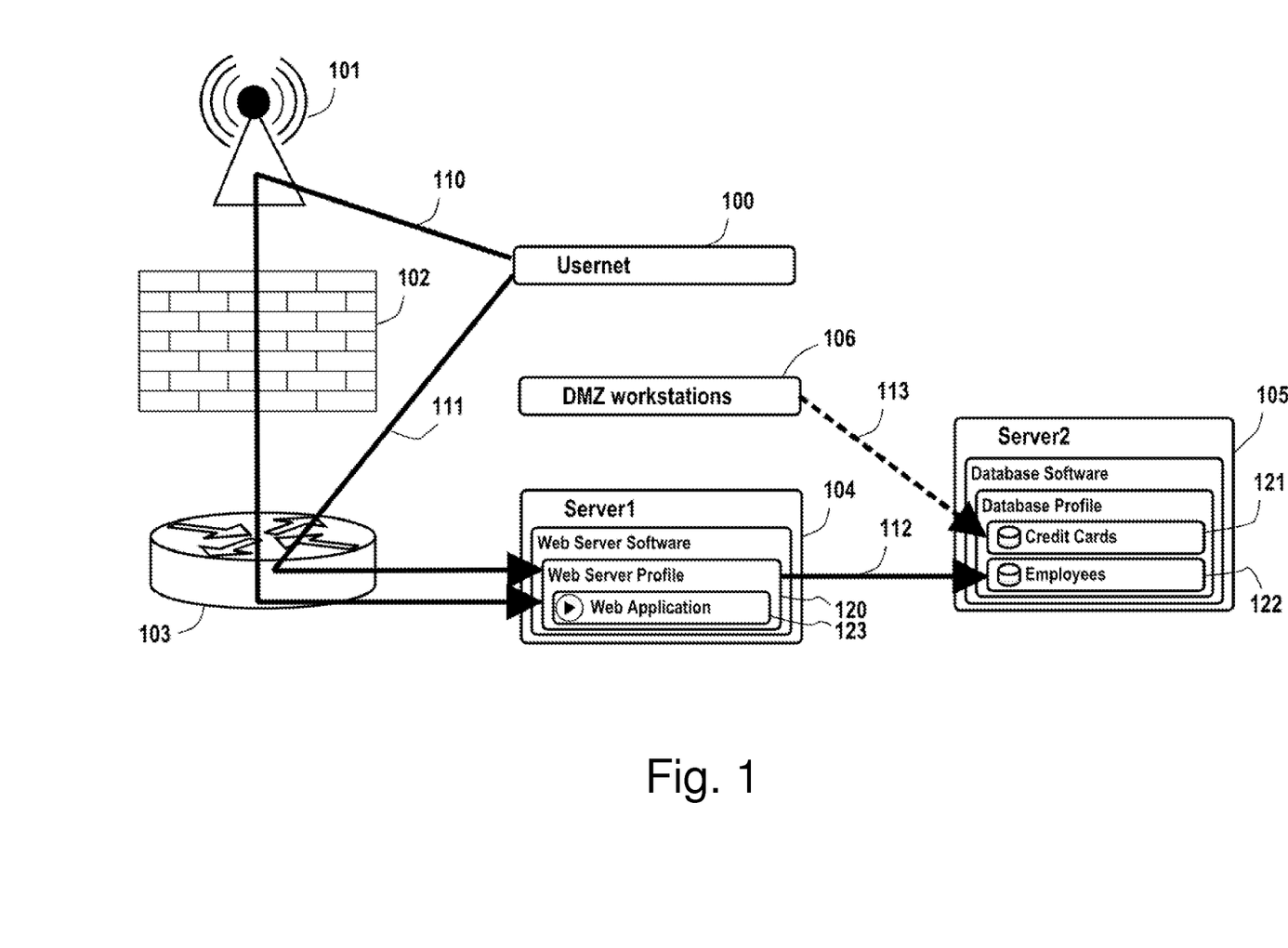
FIG. 1 is an example data flow diagram according to one embodiment of the present invention.

FIG. 1 shows an example data flow diagram and relevant hardware and software systems. There are two data flows 110 and 111 from a group of user workstations 100 (e.g., workstations 100 are grouped into a group named "Usernet" shown in FIG. 1). Data flow 110 is going via wireless access point 101, firewall 102, and router 103 to server 104. Data flow 111 is going via router 103 to server's 104 Web Server Profile 120. From Web Server Application 123 of Web Server Profile 120 data flows further via data flow 112 to server 105. Another group of workstations 106 (e.g., workstations 106 are grouped into a group named "DMZ" shown in FIG. 1) has a data flow 113 to a database with Credit Cards data 121. Data flow 113 is depicted with dashed lines to differentiate it from data flows 110, 111, and 112 that do not carry credit card data. Information that data flow 113 is related to credit card details is a data flow attribute.

Figure 2:
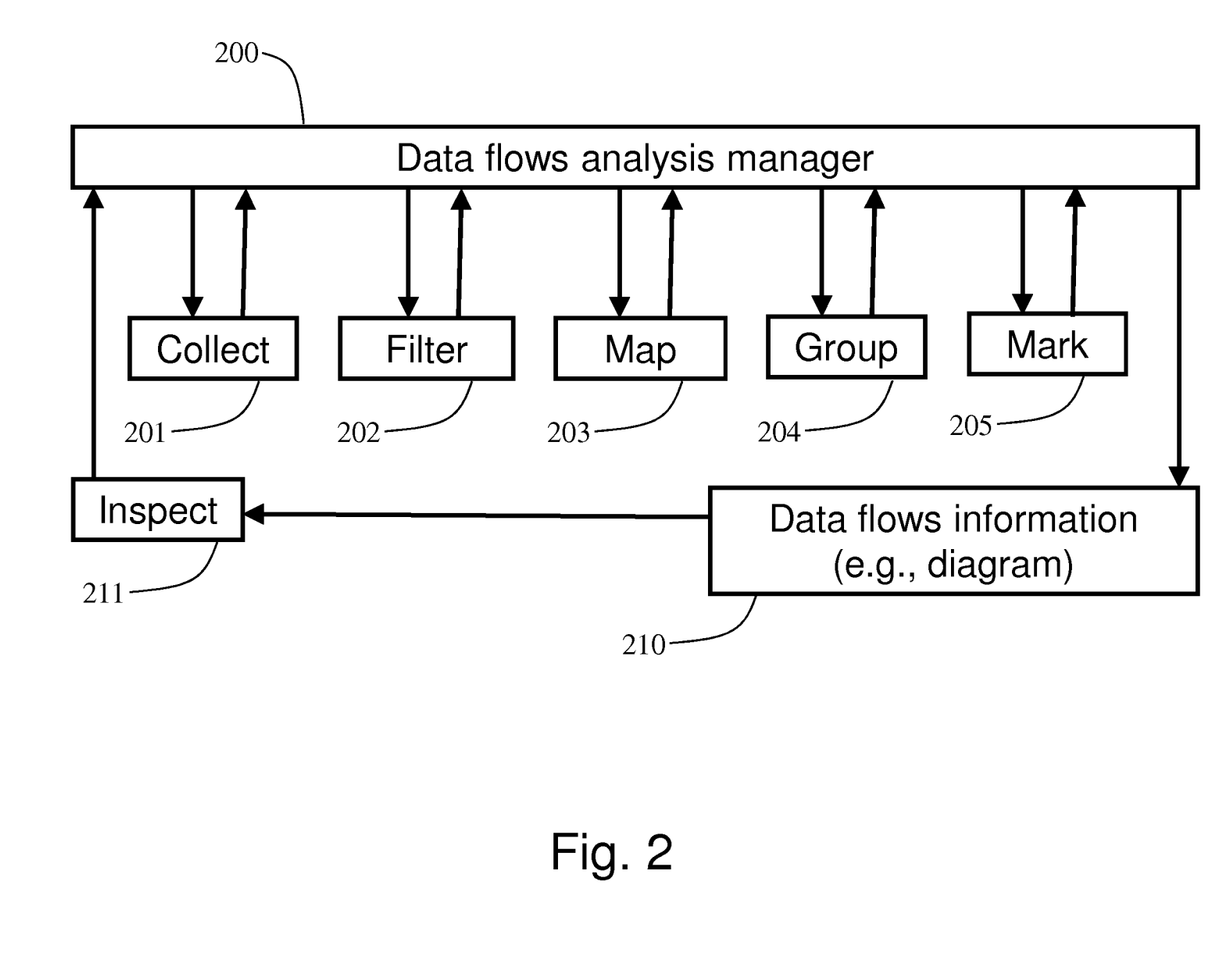
FIG. 2 is a system diagram for identifying, documenting, visualizing, and analyzing data flows according to one embodiment of the present invention.

As shown in FIG. 2, the present technology relies on information collection 201, filtering 202, mapping 203, grouping 204, and marking 205 via a data flows analysis manager 200. If the resulting data flows information (e.g., diagrams and other reports) 210 do not pass manual or automated inspection (also known as verification) 211, the analysis may be repeated via the data flows analysis manager 200. Below we explain these possible steps in geater detail.

Information about the network connections and component dependencies in the enterprise IT environments as well as information about the network topology can be collected using a variety of tools and methods, and can be accessed for analysis by the data flows analysis manager 200. For example, modern switches support mechanisms to monitor and collect information about the network connections. Some tools collect information about the network connections and computer system component dependencies by analyzing software configurations or observing network connections on the computer systems. Computer system inventory discovery systems capture information about computer systems and their attributes and configurations. Nikolai Joukov, Birgit Pfitzmann, HariGovind V. Ramasamy, Murthy Devarakonda, "Application-Storage Discovery", SYSTOR 2010, wholly incorporated by reference as if fully set forth herein, describes an example of the computer system inventory and dependency discovery system. Network topology discovery tools and methods typically rely on sending out probing requests and analyzing replies. Bruce Lowekamp, David R. O'Hallaron, and Thomas R. Gross "Topology Discovery for Large Ethernet Networks", SIGCOMM 2001, wholly incorporated by reference as if fully set forth herein, describes an example of the network topology discovery tool. Data collection tools or devices can be used with or without modifications and augmentations to collect more information for the purposes of data flows analysis. One example of the aforementioned augmentation is collection of network connection related information from configuration files of software installations on computer systems.

In general, information about the network topologies, network connections and network component dependencies, as well as inventory of computer systems, their software components, configurations and attributes, classification and attributes of data objects and flows may either be collected using tools, devices, manually, via interviewing personnel, collected from existing configuration management databases, and any combination thereof. This step of collecting information is depicted as reference no. 201 in FIG. 2. Software installations, data objects, their configurations and attributes, subnetworks, security zones, and all types of groups of network components are included in the term "network components" herein. Files, directories, databases, tables, columns, queues, application modules, URLs, jobs, disks, disk partitions, are some examples of data objects.

It should be noted that some information may be inferred from other information during the data collection phase. For example, a network topology diagram may be extended with the network components that were not originally present but can be inferred from the information about network connections. Remote servers 316 and 317 shown in FIG. 3, for example, may not be present in the existing network diagrams but they may be added to the network topology diagram if the set of network connections includes connections to such servers.

Figure 3:
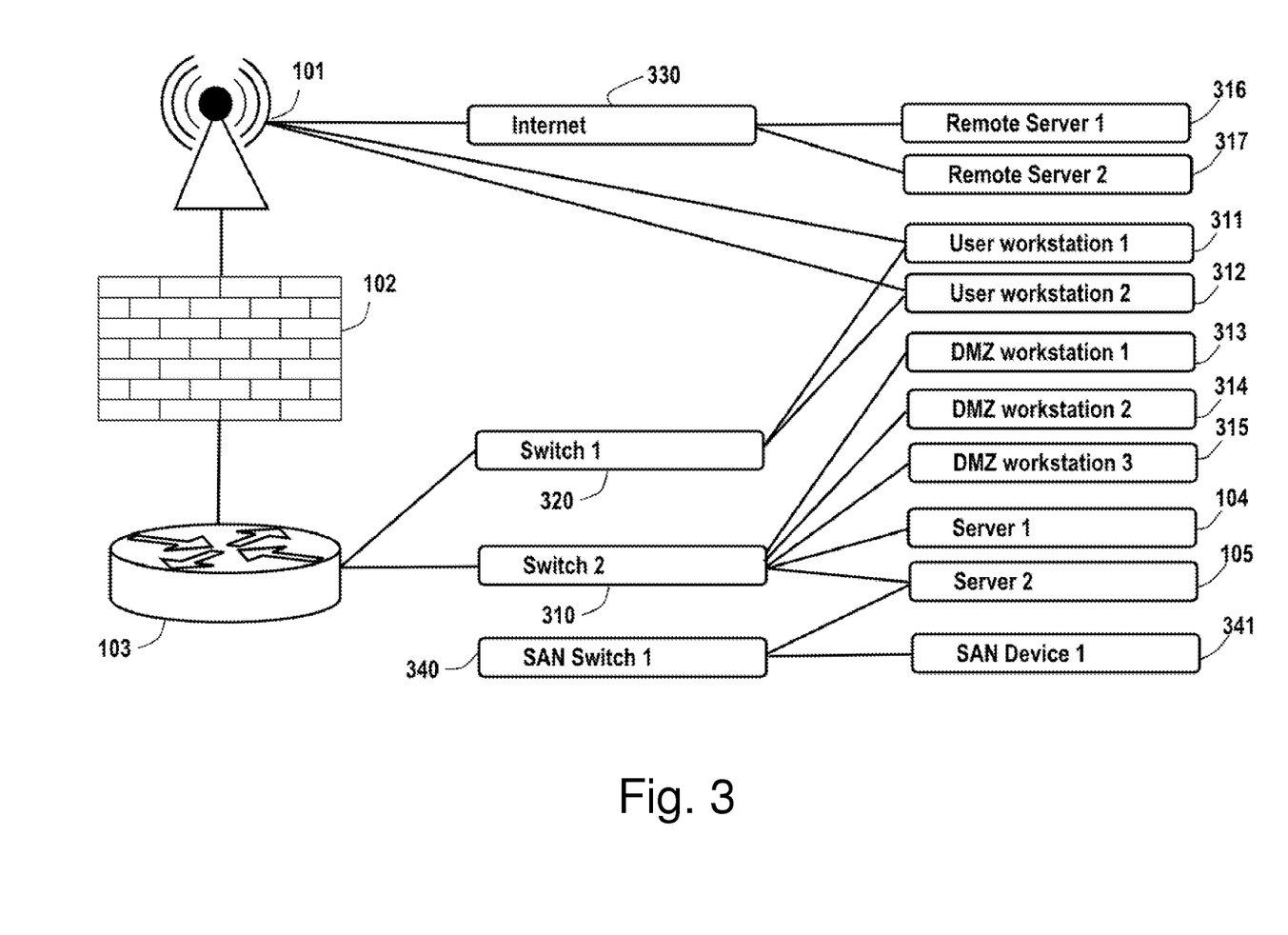
FIG. 3 is a network topology diagram (topology graph) according to one embodiment of the present invention.

FIG. 3 shows one of the possible examples of network topology diagrams. User workstations 311 and 312 have a physical network link (e.g., with Ethernet cables) with switch 320 and a wireless link with access point 101. Remote servers 316 and 317 are connected to the networking environment depicted in the network topology diagram via Internet 330 and access point 101. Access point 101 is physically linked to firewall 102. Firewall 102 is physically linked to router 103. Router 103 is physically linked to switches 310 and 320. DMZ workstations 313, 314, and 315 and servers 104 and 105 are physically linked to switch 310. Server 105 and SAN Device 341 are physically linked to SAN switch 340.

Figure 4:
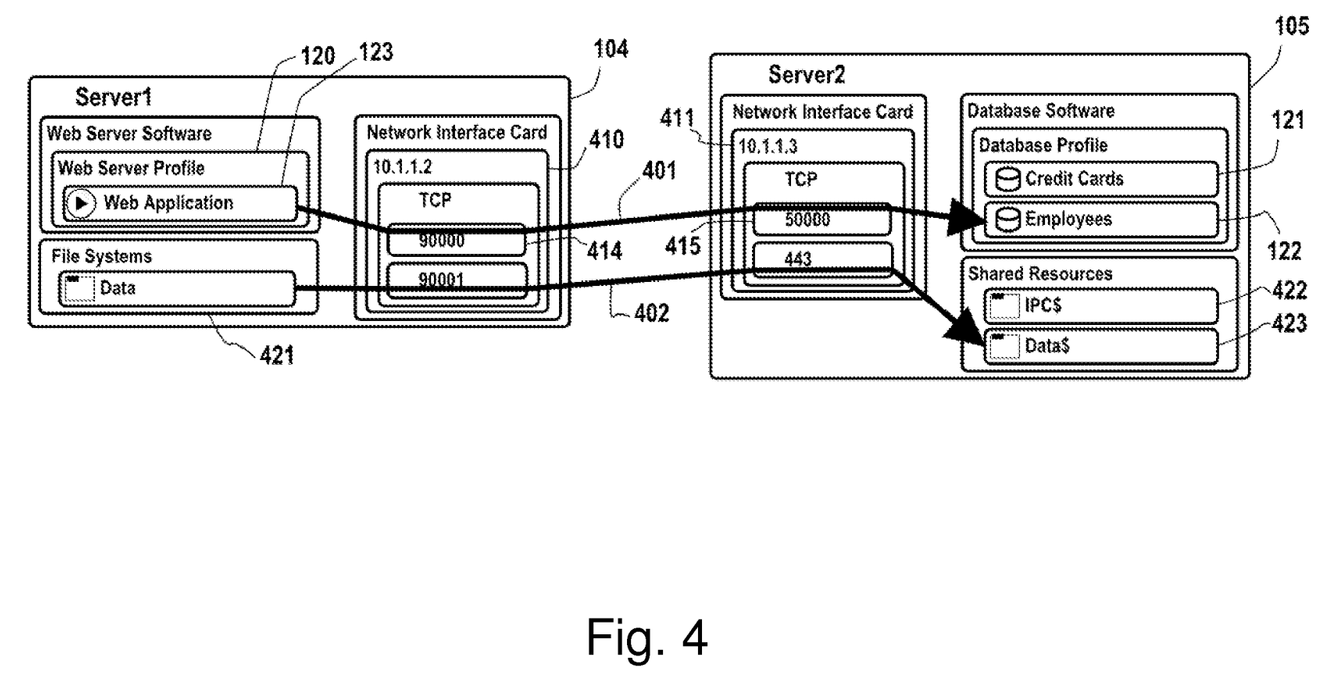
FIG. 4 is a diagram showing network connections and their attributes, according to one embodiment of the present invention.

FIG. 4 depicts an environment related to network connections. Network connection 401 is initiated from Web Application 123 on server 104 to database 122 on server 105. Network connection 401 is established from IP address 10.1.1.2 (referenced at 410), port 90000 (referenced at no. 414) to IP address 10.1.1.3 (referenced at no. 411), port 50000 (referenced at no. 415).

Not all collected information is relevant and necessary for the data flow analysis. For example, connections to port 53 of DNS servers, connections between server monitoring or management software may be filtered out from the collected data because they may not be necessary for the analysis of the data flows and they may not correspond to data flows. Similarly, some management devices or servers or management software on the servers that is known not to be part of data flows can be removed from the input information. The filtering process may result in a dramatic simplification of the information for analysis, sometimes reducing the number of connections by orders of magnitude. The filtering may be based on many types of rules including but not limited to filtering out specific types of software and network connections to that software, filtering out based on network device or computer system type, filtering out based on connection ports, accessed objects, or any combinations thereof. A typical example of connection filtering based on accessed objects is filtering of connections to shared folders: connections to inter-process communication share named "IPC$" (e.g., referenced at no. 422 in FIG. 4) may be filtered out, in most cases, while connections to shares with other names (e.g., network connection 402 to shared folder "Data$" referenced at no. 423 in FIG. 4) may be related to data flows and may be left in the information set for further analysis. Filtering step 202 is shown in FIG. 2.

Network connections and dependencies are defined between servers, workstations, clusters of servers, other devices, software components, and software objects (data objects). For example, a simple connection may be defined between two IP addresses: source and destination. Network topology graphs, like the one shown in FIG. 3, contain information about immediate connections between computer systems. In order to generate diagrams similar to the one depicted in FIG. 1 it may be necessary to map network connections to the network topology nodes (such as servers, routers, workstations, storage devices, switches, firewalls, access points, and so forth) and network links (e.g., Ethernet cables) between them. This mapping is shown as step 203 in FIG. 2.

There are many ways to map network connections and other types of dependencies to network topology diagrams. For example, it is possible to use a standard depth-first graph search algorithm. In other words, for every network connection or dependency from network component A to network component B one may try to find all paths from A to B via the network topology graph. A more specific example: 1) for A and B find corresponding network components in the network topology graph (by finding matching attributes such as IP addresses); 2) start from network component A on the network topology graph (assume that current network component is A); 3) from the current network component follow existing network links to reach adjacent network components; if an adjacent network component was already visited on the way from A try to look for another way from A to B, if an adjacent network component was not visited then repeat step 3 for the adjacent network component, and if the adjacent network component is B then record the discovered path including the network components, links, and network connections. Look for paths from A to B until all possible paths are tried. It should be noted that several paths from A to B may be possible. For example, there are two paths for a network connection from workstation 311 to server 104 as shown in FIG. 3. Thus, the search for paths between workstation 311 and server 104 will find path1 via network components 311, 101, 102, 103, 310, 104 and path2 via network components 311, 320, 103, 310, 104. Path1 and path2 also correspond to data flows 110 and 111 respectively, as shown in FIG. 1.

The decision to follow a network component or a network link may be further enhanced by analyzing configurations of the network components. For example, if a firewall rule blocks network connections from A and B, there may be no reason to map the corresponding path from A to B via the firewall. However, even such paths may be useful for data flow analysis (e.g., to analyze how data would flow without a firewall or without a firewall rule). Similarly, it is possible to analyze router configurations on the network components (any network component may have routing rules) and follow only the paths that comply with router rules. For example, there may be no reason to map path1 (e.g., data flow 110 shown in FIG. 1) if workstation 311 has a routing rule that directs all traffic to router 103 if the network link via switch 320 exists. In this case, the traffic will be routed via path2 (e.g., data flow 111 shown in FIG. 1). Firewall configuration and routing information can be collected in step 201 shown in FIG. 2 from the network systems, for example, by reading configuration files or issuing commands (such as "route"). Filtering out some data flow paths based on routing or firewall configurations is one of the forms of filtering (e.g., filtering step 202 shown in FIG. 2).

There may be hundreds of thousands of workstations in a large company. There may be billions of network components in the Internet with many of them communicating with the network environment being analyzed. In general, there may be a need to group related network components together, in order to be able to efficiently analyze them and present results using visual diagrams. Step 204 shown in FIG. 2 depicts the grouping step.

One method to identify and group related network nodes together is based on matching rules. A matching rule may state that network components with a given name, IP address, or those that belong to a specific subnetwork should be grouped into a group. This formed group may have a name. A set of rules may be created in advance for common internet and cloud services with known IP address ranges. Such rules may be reused for different network environments and different companies. For example, servers 316 and 317 may have fixed IP addresses and belong to a known cloud service. In practical situations it makes sense to group several such servers together into a group with an easy to recognize name. Other rules are built for a specific client environment. For example, workstations 311, 312, and 313 shown in FIG. 3 belong to a set of IP address ranges reserved for user workstations. Therefore, such workstation IP addresses would match a rule for user workstations based on IP addresses and may be grouped into a group named "Usernet" (e.g., workstations 100 grouped into the group Usernet as shown in FIG. 1). The rules may include a combination of other conditions and attributes. For example, a grouping rule may state that network components that belong to a given subnetwork and have a workstation (or non-server) type of operating system should be grouped into the workstations group. Another example of a network component-grouping rule is the rule to group wireless access points based on a set of attributes such as matching wireless network ID.

One or multiple network connections may be grouped into groups of network connections. For example, connections from the same software component on one server to another software component on a server may be grouped together even if any other attributes or objects that belong to the aforementioned software components that are connected by the aforementioned network connections differ. Network connections and network component grouping rules themselves may have a variety of syntax forms, including XML and SQL syntax, or may be implemented as a code fragment as part of a computer program.

Various network component connections and dependencies may correspond to data flows of different types. In addition, data flow direction may be the same or different as the direction of a corresponding network connection or other dependency. A data flow may also be bidirectional or direction may be unspecified. Therefore, it is important to 1) map network connections or other dependencies to data flows, 2) assign data flow attributes such as data flow criticality and direction, and 3) map data flow attributes to network components. These operations are shown as marking 205 in FIG. 2.

There are a variety of ways to map network connections and other component dependencies to data flows. For example, one may assume that each network connection that is not filtered out corresponds to a data flow. Yet another way is to assume that connections correspond to data flows based on matching rules. A matching rule may be applied to various configuration elements and attributes. For example, specific types of software are known to establish connections that are data flows. In orde to further differentiate connections that correspond to data flows or certain types of data flows, it is possible to use the rules that map connections to data flows based on configuration elements and attributes. (For example, software configuration files or other configuration elements may have information about the target server name or IP address and port number that correspond to data flows. It should be noted that such data flows may or may not correspond to network connections discovered during the information collection step.) In addition, mapping of connections to data flows may be performed by interviewing people to filter or augment data flows or deriving extra information from existing documentation. Identification of data flows is the mapping of network connections or dependencies or other kinds of collected information to data flows.

Data flows carry various types of data and different types of data may be treated and analyzed differently. For example, data flows with credit card information are subject to audit and rigorous treatment based on specialized security standards. There are many ways to assign data flow attributes (e.g., type, direction, and criticality) to data flows. This assignment may be performed by interviewing or otherwise requesting input for data flows from people (typically information technology personnel). Attributes may be assigned based on existing documentation. Attributes may be assigned based on rules. For example, a rule may be used to detect that database 121 (named "Credit Cards") contains information of credit cards either based on the database name or based on the names of the database columns or database data in its tables: if any data field matches a regular pattern (e.g., a credit card number pattern) the database is marked as database with credit card data. Network connections and dependencies to such network components may be marked as credit card related. For example, let us assume that database 121 in FIG. 1 was detected to have credit card data based on a data type rule consisting of a credit card number regular pattern that matched against some database data. As a result, we can mark data flow 113 in FIG. 1 as credit card related data flow because the data flow is connected to database 121 that is known to be related to credit card data.

Software tools or hardware appliances that inspect the data may be used to identify the type and other attributes of data flows. For example, information from Data Loss Prevention (DLP) systems often deployed on some network links may provide information about the type of some network connections and data flows such as data flows with credit card data.

A data flow may be directed via a path of network components of various kinds. These network components if malfunctioning or compromised by malicious users may disrupt a data flow or allow intruders to observe the data in the data flow. Therefore, such network components should be identified and treated appropriately. One of the ways to identify network components responsible for a data flow is to mark each network component on the data flow path as a component that carries the data flow. For example, data flow 110 shown in FIG. 1 depends on network components 100, 101, 102, 103, and 104. It should be noted that the granularity of this marking and assignment of data flow attributes to network components may vary. For example, the whole server 104 may be assigned to the data flow or only Web Server Profile 120 shown in FIG. 1.

As will be appreciated by a person skilled in the art, aspects of the present invention may be embodied as a method, system, or a computer program. Thus, aspects of the present invention may take the form of a hardware embodiment, a software embodiment, or an embodiment combining software and hardware, as well a computer program embodied in one or more computer readable medium(s). A computer readable medium may be any tangible medium that can contain, or store a program for use by or in connection with an instruction execution system or device.

Figure 5:
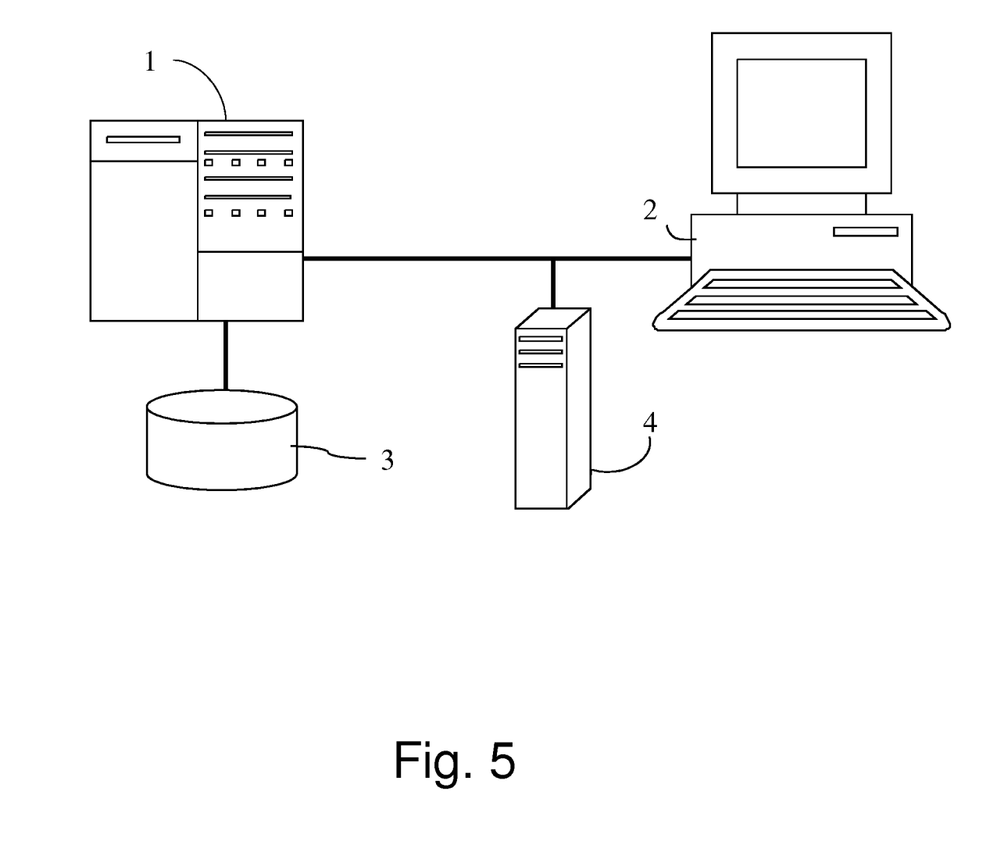
FIG. 5 is a block diagram showing elements of computer system suitable for implementing methods as described herein.

FIG. 5 depicts elements of computer system suitable for implementing methods as described herein. The compute system includes processing unit 1 with one or more cores, memory, and may contain local storage in the form of a hard disk, flash disk, or other storage medium, or may have remotely accessible storage 3 or other components necessary to execute a computer program. It is noted that the computer system may contain more processing units in the form of servers or workstations 2 or other units capable of executing instructions such as printers, routers, switches, firewalls, storage controllers, special purpose networking equipment, and other units 4. The processing units may be interconnected via wired and/or wireless connections.

It should be understood that the terms "includes", "include", "including", "comprises", "comprise", and "comprising" in this document specify the presence of the stated features, components, operations, and steps but do not preclude the presence of other features, components, operations, and steps. Articles "a", "an", and "the" are intended to include plural forms as well unless the context clearly states otherwise. The terminology used in this invention is for the purpose of describing a particular embodiment and is not intended to limit the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form.

To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers. It is inherent herein that the present invention is tied to at least one system (e.g., firewall 102), and/or transforms at least one article (e.g., firewall rules, etc.) and/or data representative of one article (e.g., data flow).

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. The description is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer-implemented method for identifying, visualizing, and analyzing a networked computer environment, the method comprising:
    collecting information about the networked computer environment, including network topology of network components and network connections via a network topology graph, network component dependencies, configurations, and attributes, software components, software objects, and data objects;
    filtering one or more of the network connections from the information collected based on the software components, software objects, and data objects of certain types that are accessed via the network connections, thus resulting in filtered network connections;
    identifying data flows between the software components, software objects, and data objects of the certain types over the filtered network connections;
    mapping the data flows over the filtered network connections to the network components via the network topology graph in order to find paths between the software components, software objects, and data objects of the certain types, wherein each of the paths includes a set of the data flows mapped to a respective set of the network components;
    marking the set of the data flows included in each of the paths with one or more attributes of the software components, software objects, and data objects of the certain types associated with each of the paths, thus resulting in marked data flows associated with each of the paths;
    marking the respective set of the network components included in each of the paths with the one or more attributes of the marked data flows, thus resulting in marked network components associated with each of the paths;
    defining and organizing data environments, security environments, and security zones to include the marked network components;
    defining firewalls for the data environments, security environments, and security zones; and
    displaying the networked computer environment including the data environments, security environments, and security zones, filtered network connections, and the marked data flows and the marked network components associated with each of the paths.

2. The computer-implemented method according to claim 1, wherein finding paths between the software components, software objects, and data objects via the network topology graph is performed using a depth-first graph search algorithm.

3. The computer-implemented method according to claim 1, wherein finding paths between the software components, software objects, and data objects further comprises:
    analyzing routing and firewall rules of the network components as filtered; and
    excluding network connections as filtered from mapping of the data flows according to the routing and firewall rules.

4. A computer-implemented system to identify, visualize, and analyze a networked computer environment, the system comprising:
    a processing device; and a memory storing instructions that, when executed by the processing device, cause the processing device to perform operations comprising:
collecting information about the networked computer environment, including network topology of network components and network connections via a network topology graph, network component dependencies, configurations and attributes, software components, software objects, and data objects;
filtering one or more of the network connections from the information collected based on the software components, software objects, and data objects of certain types that are accessed via the network connections, thus resulting in filtered network connections;
identifying data flows between the software components, software objects, and data objects of the certain types over the filtered network connections;
mapping the data flows over the filtered network connections to the network components via the network topology graph in order to find paths between the software components, software objects, and data objects of the certain types, wherein each of the paths includes a set of the data flows mapped to a respective set of the network components;
marking the set of the data flows included in each of the paths with one or more attributes of the software components, software objects, and data objects of the certain types associated with each of the paths, thus resulting in marked data flows associated with each of the paths;
marking the respective set of the network components included in each of the paths with the one or more attributes of the marked data flows, thus resulting in marked network components associated with each of the paths;
defining and organizing data environments, security environments, and security zones to include the marked network components;
defining firewalls for the data environments, security environments, and security zones; and
displaying the networked computer environment including the data environments, security environments, and security zones, filtered network connections, and the marked data flows and the marked network components associated with each of the paths.

5. The computer-implemented system according to claim 4, wherein finding paths between the software components, software objects, and data objects via the network topology graph is performed using a depth-first graph search algorithm.

6. The computer-implemented system according to claim 4, wherein finding paths between the software components, software objects, and data objects further comprises;
analyzing routing and firewall rules of the network as filtered; and
excluding network connections as filtered from mapping of the data flows according to the routing and firewall rules.

* * * * *